UNITED STATES PATENT OFFICE.

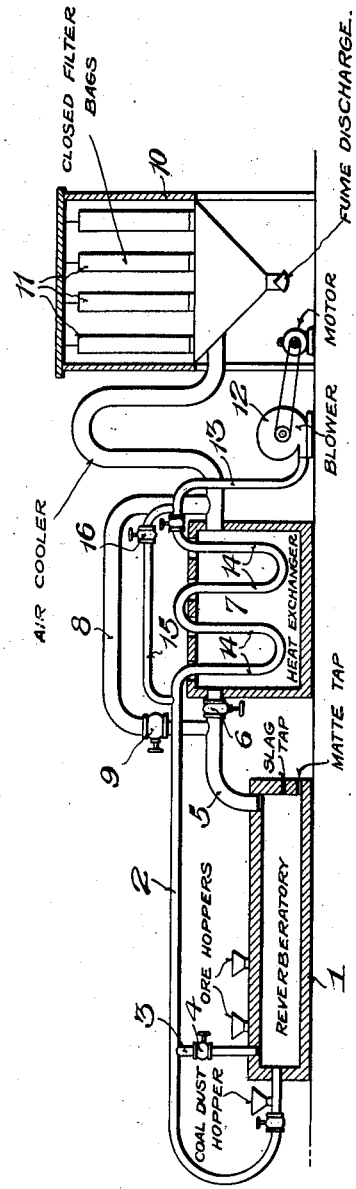

LEWIS BAILEY SKINNER, OF DENVER, COLORADO.

PROCESS OF TREATING ORES.

1,350,286.  Specification of Letters Patent.  Patented Aug. 17, 1920.

Continuation of application filed February 11, 1918, Serial No. 216,594. This application filed February 10, 1919. Serial No. 276,125.

*To all whom it may concern:*

Be it known that I, LEWIS B. SKINNER, a citizen of the United States, residing at Denver, in the county of Denver and State of Colorado, have invented certain new and useful Improvements in Processes of Treating Ores; and I do hereby declare the following to be a full, clear, and exact description of the invention, such as will enable others skilled in the art to which it appertains to make and use the same.

This invention relates to processes of treating ores; and it relates more particularly to reverberatory furnace treatment of so-called complex ores containing zinc, usually accompanied by lead, gold and silver, and often carrying some copper. In their natural state, such ores may be sulfids; or they may be oxidized ores such as silicates, carbonates, sulfates, oxids, etc.; or they may be mixtures of these different types.

It is a well known fact that the treatment of complex zinkiferous ores of the above character has long been a most difficult problem, and various methods of separating the metal values, both by treatment in a wet way and by smelting, have been heretofore proposed. Some of the proposed methods are unsatisfactory or wholly impracticable commercially either because of technical difficulties involved, inherent inefficiency, or excessive cost; while others are metallurgically impossible. Prior to my invention there have been some attempts to use blast furnace methods for the treatment of complex ores but no blast furnace process has proved commercially feasible for this purpose. This method unavoidably involves fluxing off in the slag a large part of the total zinc. In smelting lead ores, which contain zinc, in lead blast furnaces, it has been necessary to so select and balance the ore charge as to prevent making a slag containing more than 8 per cent. zinc as a maximum, because otherwise a substantial quantity of zinc reduces with the lead and forms what is commonly known as "lead mush", while at the same time zinc oxids build out at the cooling part of the furnace shaft forming wall accretions which clog the apparatus, these conditions soon rendering the furnace inoperative. About 7 per cent. zinc in the ore charge is the maximum permissible for commercial work in treating ores of this character in the lead blast furnace. Lead metallurgists, therefore, regard complex ores containing zinc in high quantity as presenting technological difficulties which are serious and so the custom prevails at the smelters of penalizing zinc above certain allowable percentages.

It has been proposed also to further treat blast furnace and other slags high in zinc for recovery of the zinc values. But this obviously involves a second handling of material with consequent additional cost, a fact necessarily inherent in any proposed method involving treatment in more or less distinct stages or steps.

It is a principal object of the present invention to treat ores of the character described which may be relatively high in zinc, and especially complex zinkiferous ores containing precious metal values as well as other valuable metals such as lead and copper, according to a simple and rational smelting procedure, and in such manner that the greater part of the volatilizable metal values in the ore is recovered as fume, while the precious metals, if present, are for the most part concentrated in a matte with the copper, and the gangue or waste material of the ore is separated as a slag relatively low in zinc content, that is, ordinarily containing less zinc than slag resulting from the treatment of complex ores in the lead blast furnace heretofore practised to some extent, where the high zinc complex ores have to be diluted down with what are known as clean ores so as not to exceed 7 or 8 per cent. zinc in the charge. The slag obtained in the practice of my process is not free from zinc or other valuable metals of the charge treated. It contains in practice not less than about 3 per cent. zinc, as a rule, in addition to considerably smaller proportions of lead and some copper, where these metals are present in the ore; but the percentage of zinc in the charge does not have to be kept down. In applying the present process to some types of ore, a slag running 5 per cent. zinc on an average is good practice and is commonly obtained in carrying out the process of the invention commercially; and with certain ores particularly high in zinc and low in material remaining behind in the reverberatory, the allowable zinc content of the slag may be higher, even so much as 6 to 8 per cent. The ability to reduce the zinc content of the slag to these relatively low proportions, even when operating on ore charges running 15 to 20 per cent. or higher in zinc, makes possible the successful commercial furnace treatment of complex ores or ore mixtures containing far higher percentages of zinc than has been heretofore permissible in commercial furnace methods; furthermore low zinc ores can also be treated to better advantage in accordance with my novel process.

In a typical embodiment, the process of the present invention comprises mixing complex zinkiferous ores, in more or less naturally or artificially oxidized condition, in such manner as to produce a suitable metallurgical slag, and to this mixture adding carbonaceous reducing material; then subjecting this charge mixture, which should contain sufficient sulfur to form a matte, in a reverberatory furnace to heat of sufficient quantity and intensity to melt down the charge, with formation of matte and slag, which collects at an appropriate location on the reverberatory hearth as a molten mass consisting of two layers, the slag being on top. According to the best mode of practising the invention, there is employed in the charge mixture an excess of reducing material over what is necessary to effect the reductions possible in the charge; so that even after the formation of molten matte and slag, carbon remains floating on the molten mass, functioning both as a reductor and a protective agent, and eventually also as a supplemental source of heat. Such carbon travels along with the slag for some distance toward the tapping end of the furnace, being eventually burned off by the excess of oxygen, say 3 to 5 per cent., normally present with the combustion gases running 13 to 15 per cent. carbon dioxid. The reducing material thus mixed with the charge has primarily the specific function of reducing oxidized zinc and lead (if present) to readily volatilizable forms, both during and after the melting down of the charge. In the case of zinc, this involves reduction to metallic zinc, a reaction which occurs in the neighborhood of about 1020° C. Zinc oxid itself is not volatile at the furnace temperatures employed, which may be 1200° C. to 1300° C. in a typical instance, or even somewhat higher in some cases; but metallic zinc is volatilizable at a much lower temperature. Under the conditions described, therefore, the bulk of the zinc in the charge is volatilized as soon as reduced to metallic condition, passing thence into the atmosphere of the reverberatory chamber, where it is subsequently oxidized by excess oxygen introduced with the firing fuel, or by carbon dioxid, and is conducted from the furnace in company with lead oxid, sulfate, etc., as a metalliferous fume. The firing of the reverberatory furnace is so conducted, and the conditions of operation are so controlled, that the charge on the hearth is not exposed extensively to oxidizing conditions. The maintenance of a protective non-oxidizing, specifically a reducing, atmosphere adjacent the material undergoing treatment on the hearth, is facilitated by the evolution of carbon monoxid resulting from the endothermic reaction between the reducing material and the reducible constituents of the charge. This carbon monoxid oozes upwardly through and from the charge mixture as it melts down and forms a protecting blanket of what amounts practically to producer gas, subsequently diffusing into the upper part of the furnace chamber where oxidizing conditions ordinarily prevail and being there oxidized to carbon dioxid. The heat resulting from this oxidation of carbon monoxid to dioxid supplements that due to the combustion of the firing fuel, and with it is radiated downwardly upon the hearth to smelt the charge. Where an excess of reducing material is present in the charge, as is best in actual practice, the carbon not only reacts in *loco situ* within the charge before melting, but the excess floats on the lake of slag above the matte after the charge has melted down. Such excess carbon continues to react with unreduced zinc or non-volatile lead compounds which may still persist, and as a result of this reducing action, metallic zinc and volatile forms of lead boil out of the molten mass and form part of the fume leaving the furnace. It will be seen therefore that by having the charge melt down and remain for a relatively long period of time subject to intense heat and to the action of the reducing material of the charge mixture, I am enabled to volatilize an unusually high percentage of zinc and lead; or, in other words, to make a commercial success of handling so-called complex ores even of relatively very high zinc content.

The foregoing general description of the present process makes clear the fact that it differs fundamentally from blast furnace methods of treating ores of the character in question. The ordinary lead blast furnace commonly employed heretofore in smelting ores containing zinc operates under what may be styled "flash" smelting. The charge, consisting of ore, flux, and coke, forms a column of broken material through which heated gases pass. All molten material, immediately upon being formed, drains rapidly away from the coke and from the still unfluxed pieces of the ore charge. The coke is consumed by the air blast, furnishing the heat necessary to smelt the charge, instead of serving primarily only as a reducing agent. To operate properly, the large bulk of the material charged into the blast furnace must be oxidized, and the mixture operated upon must be such as to produce an easily fused slag running approximately 30 per cent. silica, 20 per cent. lime, and 30 per cent. iron. The conditions under which the charge is melted down in the blast furnace therefore differ radically from those in the present method where the charge is melted down on a reverberatory hearth and is subjected to protracted heat treatment under reducing conditions. The described conditions of blast furnace operation preclude the treatment therein of complex ore charges high in zinc. Numerous attempts have been made to run high zinc ores in blast furnaces, but these have been unsuccessful in procuring commercial results.

As the employment of relatively high temperatures, 1200° C., or above, is distinctly advisable in the practice of my process, the firing proper of the furnace is best effected by the combustion of a suitable fuel with the aid of preheated combustion air. Most advantageously this is effected by utilizing the intensely hot fume-laden gases passing from the furnace to preheat the air for combustion. Broadly speaking, regenerative heating of metallurgical furnaces, including reverberatory furnaces, is of course old. But so far as I am aware, the present process is the first to utilize intensely hot furnace gases laden with metalliferous fume to preheat combustion air for firing a furnace, specifically, a reverberatory furnace. The reasons why this has never been done before are fairly obvious. In the first place, the use of the Siemens type of regenerator, involving a brick checker-work as the heat exchanger means, is practically out of the question where fume-laden gases are concerned, because the checker-work would very soon become clogged and inoperative by reason of fume deposit. On the other hand, the double surface hot stove system, commonly constructed of a metal such as iron which is attacked and destroyed at temperatures even considerably below that of the gases leaving the furnace in my process, would seem wholly unsuited as a heat exchanger in this connection. I have discovered, however, that by taking proper precautions, it is entirely possible to use a double surface heat exchanger of the iron pipe type, and to employ it with furnace gases at a temperature above even the softening point of the iron, without destructive action on the heat exchanger. This is due to a discovery which I have made that the fumes of the volatile metals under process of recovery by my method may be condensed on the outer surfaces of the metallic pipes in an amount sufficient to protect their surfaces. This coating adheres tenaciously to the iron pipes to a thickness sufficient to thoroughly protect the iron from burning, but it does not build up sufficiently thick to prevent effective heat transference, because of the fact that the adhesion of the fume deposit to metal is much more tenacious than to previously deposited fume. This tenacious skin of deposited solid material is of relatively low heat conductivity as compared to the much greater heat conductivity of the metal which it protects. By way of illustration let it be assumed that the metal of the iron pipes itself is one inch in thickness, and that the built-on protecting layer of fume is also one inch thick. If the fume has, say one-tenth the heat conductivity of the iron, and were the iron to be easily destroyed or burnt up at approximately 1000° C., and if the fume laden gases have a temperature of say 1300° C., it is evident that by passing cool air through the pipes in the proper quantity, the air will abstract heat rapidly enough from the iron pipe to keep its temperature materially below the danger point, this danger point being attained only at some locality beyond the outer surface of the iron pipe and within the adherent protecting layer of fume. By utilizing a sufficient length of metal pipe and continuously circulating air therethrough, it is feasible to preheat this air to a temperature of 500° C. or above, without endangering the structural integrity of the heat exchanger. By properly controlling the operating conditions at first, so that the protective skin of metalliferous fume is condensed and deposited on the heat exchanger pipes at a temperature below the destructive temperature, the heat may then be raised and operations continued with the furnace gases passing through the heat exchanger at temperatures well above 1000° C. In accordance with my discovery, therefore, it is possible to effectively preheat the air for combustion under the conditions described, and at the same time to enable operations to be carried on without frequent interruptions for the purpose of freeing the heat exchange elements of collected fume, as would be the case if brick checker-works were used. A considerable amount of fume may of course be deposited from the hot gases as they pass through the heat exchanger. As stated, after the first deposit of fume on metal there is much less tendency for the fume to adhere to the coated heat exchanger pipes; so that the bulk of such fume simply drops to the bottom of the chamber whence it can be removed in any convenient manner without interrupting operation of the furnace. The gases leaving the heat exchanger are conducted through an air cooler if necessary, and thence to a bag house or other convenient means for removing the remainder of the fume from the gases.

In order to further explain the principles of the invention, but without restricting the invention to specific details of procedure, a typical example of one way of carrying out the process will now be described. In this typical example chosen for purposes of illustration, the ore material of the charge is derived wholly or in part by partially roasting complex sulfid ores, leaving a relatively small amount of sulfur, but enough to secure a suitable matte fall. Naturally oxidized ores, such as silicious or carbonate ores high in silica may be, and most desirably are, mixed with the partially roasted sulfids, which are ordinarily high in the base iron. Where necessary or desirable, lime rock may be mixed in suitable proportion with the ore to insure a properly balanced charge. The ore material of the charge consists, therefore, of partially roasted basic sulfids, together with silicious material containing little or no sulfur, the constituents of the charge being so balanced as to secure a proper slag and enough matte to rob the slag constituents of gold and silver. In the case assumed, the ore may contain about 18 per cent. zinc and 8 per cent. lead, together with say 2 per cent. copper, 8 to 10 per cent. sulfur, 20 to 25 per cent. iron, 20 to 25 per cent. silica, and about 2 per cent. lime, the remainder being oxygen, and oxids of aluminum, barium, etc.

With this ore material is mixed enough carbonaceous reducing agent, most desirably fine coal or coke in this instance, to insure a reasonable excess over the amount theoretically necessary to react with the reducible constituents of the ore charged. For an ore of this character it is ordinarily sufficient to mix therewith 15 per cent. by weight of fine coal. It may be stated here that coke or coal low in hydrogen is particularly suited both for mixing with the ore charge and also for use as firing fuel. A fuel high in moisture or in hydrogen is less desirable for use in practising the invention because of the fact that where the furnace gases carry large amounts of $H_2O$, there is a tendency for the fume to form a moist impervious mass on the filter bags, and thus to interfere with their efficient operation. While the use of a fuel low in moisture or moisture producing constituents is a desirable specific feature of the invention, it is of course not intended to limit the invention thereto. Under some conditions, and especially where means other than bag filters or supplemental thereto are employed to collect the fume, other carbonaceous fuels such as certain forms of bituminous pitch and residua of various kinds can be mixed with the ore of the charge to act as reductor material.

While the invention is capable of being carried out in variously arranged systems, and while in particular it need not, in its broader aspects, involve the feature of regenerative heating above referred to, I have illustrated more or less diagrammatically in the accompanying drawings, one arrangement of plant which has proved satisfactory in practising the invention. In employing this system, the mixture of ore and reducing material prepared as described is charged from the indicated ore-charging hoppers upon the hearth of the reverberatory furnace 1, which may be of the usual or any preferred type, and is there subjected to an intense smelting heat at a temperature sufficiently high to insure reduction of zinc and lead to volatile forms. As before pointed out, this requires a temperature of above 1020° C., which temperature is the reduction temperature of zinc oxid to the metal. Lead oxid is volatile at this temperature, and a large part of the lead content of the ore therefore probably passes off as lead oxid without undergoing reduction to metallic lead, though for convenience reduction and volatilization of both zinc and lead is hereinafter spoken of. The lead may be present in the fume as the oxid or sulfate, or both. In practice I find a furnace temperature of from 1200 to 1300° C. to give excellent results with the type of charge here described. Finely powdered coal is preferred as fuel for firing the furnace, the coal being blown into the furnace with a blast of preheated air supplied through pipe 2, which leads from a preheater to be hereinafter more fully described. The charge melts down on the hearth in the manner already described, the zinc and lead constituents of the ore undergoing reduction and being volatilized for the most part, and molten matte and slag being formed, all the material on the hearth being substantially shielded throughout from the oxidizing atmosphere prevailing in the upper part of the furnace chamber by a blanket of non-oxidizing gases.

For treating 75 tons of ore a day, I have found a reverberatory furnace approximately 65 feet long and 15 feet wide effective. The charge being introduced toward the firing end of the furnace, and finally melting down to furnish a mass of molten matte and slag which may be respectively tapped at points adjacent the other end of the furnace, as shown, the charge undergoes heat treatment under substantially reducing conditions for a period of time sufficiently prolonged to insure the desired reactions and separation from the ores of their valuable constituents. With the type of charge and under the operating conditions assumed, the slag tapped from the furnace runs on an average about 5 per cent. zinc, or somewhat less than is obtainable under the most favorable conditions in blast furnace practice with the ores as charged running only about 7 per cent. zinc, as against 18 to 20 per cent. zinc for the ore treated in accordance with my process.

The slag produced in the specific example of my process above assumed also contains approximately 1 per cent. lead, 40 per cent. silica, 30 per cent. iron, 5 per cent. alumina, and 2 per cent. sulfur. This particular slag would be considered too refractory for blast furnace practice on account of its high silica content. The slag fall ordinarily represents about 60 per cent. of the original ore charge in carrying out my process as described.

The matte obtained contains the bulk of the precious metals and the copper, and in the specific example described, it also contains about 2 per cent. zinc and 8 per cent. lead as an operating average. The matte fall is approximately 10 per cent. of the ore charge.

The intensely hot gases and fume escape from the furnace chamber through conduit 5, which normally discharges through a valve 6 into a heat exchange chamber 7; but where for any reason it is desired not to pass the gases through the heat exchanger they may be by-passed through conduit 8 controlled by a valve 9. From the chamber 7, or by-pass 8, as the case may be, the gases from the furnace ordinarily go through an air cooler or long conduit, as desired, to a bag house 10, provided with a plurality of fabric bags 11 into which the gases are discharged and which allow the escape of the products of combustion but retain the condensed metallic fume in the customary manner. Electrical fume precipitation, by the Cottrell method, for example, may be employed in lieu of or as supplemental to bag filtration.

The heat exchanger diagrammatically illustrated in the drawings is most desirably of the double-surface type, that is, a regenerative stove through which the heating gases always flow by the same conduits and passages and the air which is being heated likewise always follows the same path. In the construction illustrated, the hot furnace gases pass through the body of the heat exchanger chamber; while the air, which may be supplied by a blower 12 by way of pipe 13, passes through the coils or bends of pipe 14 within the heat exchange chamber. Any number of these coils may be provided, their disposition and aggregate length being a function of the amount of the heat exchange desired. A by-pass 15, controlled by a valve 16, furnishes means for passing part of the air around the heat exchanger, if desired, to lower the temperature of the air for combustion. The pipes 14 are of metal, iron in the present example; but, assuming the plant to have been preliminarily put in running condition, said pipes are already covered by a tenacious skin or protective layer of condensed metalliferous fume, as before explained; and therefore said pipes may be exposed, without danger of destruction, to a temperature well above the destructive temperature for iron. According to one method of preliminarily effecting this protective coating of the heat exchanger pipes, the furnace may be initially operated at a reduced rate and in such manner that the furnace gases entering the heat exchanger are at a temperature below that destructive to the iron pipes, opportunity being thus afforded for condensation of the necessary amount of fume on the pipes to afford a protecting layer. This having been accomplished, the operation of the furnace may proceed normally. Still another method, which does not involve any delay in bringing the furnace up to full heat, consists in preliminarily protecting the pipes by more or less temporary covering means of some kind, the temporary covering means being most desirably of such nature as to disintegrate gradually as the heating-up operation progresses, and to be eventually replaced wholly or in part by the dense metalliferous fume coating already described. For example, I may mechanically coat or smear the pipes, especially those at the end of the regenerator nearest the furnace, with clay mud; or fire clay sleeves may be dropped over these pipes. The protective layer provided by the mud coating or the fire clay sleeves, as the case may be, ultimately cracks at the high temperatures involved, and peels off or falls off, but only rather gradually. That is, it breaks away progressively in different spots, enabling the iron of the pipes to radiate the heat away from the successively exposed surfaces fast enough to prevent substantial damage. In the meantime, the exposed surfaces become permanently coated with a dense adherent layer of condensed fume, which eventually replaces part or all of the mechanically applied temporary covering.

The fume collected from the filter bags as well as that which may fall to the bottom of the heat exchanger, may be subjected to any desired refining or separating process for recovery of the lead and zinc values, but such subsequent treatment forms no part of the present invention.

The utility of the several by-passes described in providing for control of the temperatures and ratios of the air for combustion will be obvious; and where, in the claims, I have mentioned subjecting the escaping gases or entering air to a certain treatment (aside from the final step of recovering the values from the fume) this should be interpreted as applying to all or part of the air or gases as occasion may demand.

In the specific example above given, the charge is figured to form a slag consisting essentially of iron and silica; but where commercial or other conditions are favorable and a silica-iron-lime slag is desired, lime may be added to the charge. Furthermore, the character and analysis of the ore material treated may vary widely from that in the specific example given, the general mode of operation being broadly novel for the smelting or concentration of complex zinkiferous ores in particular, and, as to certain features, of ores in general containing both volatile and non-volatile recoverable values.

This application is a continuation of my co-pending application Ser. No. 216,594, filed February 11, 1918.

What I claim is:

1. The process of treating complex zinkiferous ores carrying precious metal values which comprises preparing a mixture of an oxidized ore of the character specified with an excess of carbonaceous reducing material, the mixture containing matte-forming constituents, charging said mixture on the hearth of a reverberatory furnace, firing the furnace with suitable fuel and smelting the charge at a furnace temperature of at least about 1200° C. to produce molten matte and supernatant slag shielded by a non-oxidizing atmosphere, conducting from the furnace fume resulting from reduction and volatilization of zinc from the charge, and continuing the heat treatment of said molten mass until slag tapped from the furnace contains not substantially more than about 6 per cent. zinc.

2. The process of treating complex zinkiferous ores which comprises preparing a charge of oxidized silicious ore of this character sufficiently high in iron to smelt and containing above 8 per cent. zinc, with varying smaller percentages of lead and copper, and precious metal values, and enough sulfur to form a matte, mixed with an excess of finely divided solid carbonaceous reducing material, subjecting said charge on the hearth of a reverberatory furnace to a smelting heat sufficient to melt the charge down to matte and slag while protected by a non-oxidizing atmosphere resulting from the reducing action of said carbonaceous material on the ore, conducting from the furnace metalliferous fume containing zinc and lead values obtaining matte containing copper, lead, and precious metal values, and slag containing not substantially more than about 6 per cent. zinc.

3. The process of treating complex ores carrying zinc, lead, copper, and precious metal values, which comprises mixing oxidized ore of the character described with reducing material, the mixture containing sufficient available sulfur to form a matte, smelting the mixture, without further treatment, on the hearth of a reverberatory furnace, conducting from the furnace the fume resulting from the reduction and volatilization of zinc and lead, obtaining a matte containing copper and precious metal values, and tapping off molten slag relatively low in zinc.

4. The process of treating complex ores carrying zinc, lead, copper, and precious metal values, which comprises partially roasting such ore, mixing reducing material therewith, the mixture containing sufficient sulfid to enable formation of a matte, smelting the mixture, without further treatment, on the hearth of a reverberatory furnace, conducting from the furnace the fume resulting from the reduction and volatilization of zinc and lead, obtaining a matte containing copper and precious metal values, and tapping off molten slag relatively low in zinc.

5. The process of treating complex zinkiferous ores carrying precious metal values which comprises mixing such ore in at least partially oxidized condition with an excess of carbonaceous reducing material, the mixture containing a matte-forming metal and sufficient available sulfur for production of matte, smelting the mixture on the hearth of a suitably fired reverberatory furnace to obtain a molten mass with carbon floating on its surface, said furnace being fired to give combustion gases which are somewhat oxidizing in character, conducting from the furnace the fume resulting from the reduction and volatilization of zinc, and tapping off matte carrying precious metal values and molten slag relatively low in zinc.

6. The process of treating complex zinkiferous ores carrying precious metal values which comprises partially roasting such ore, mixing therewith a reducing material, the mixture containing a matte-forming metal and sufficient available sulfur for production of matte, smelting the mixture on the hearth of a reverberatory furnace to obtain a molten mass with carbon floating on its surface, said furnace being fired to give combustion gases which are somewhat oxidizing in character, conducting from the furnace the fume resulting from the reduction and volatilization of zinc, and tapping off matte carrying precious metal values and molten slag relatively low in zinc.

7. The process of smelting more or less oxidized ores containing volatile and non-volatile metallic values and sulfur, which comprises subjecting such an ore, mixed with an excess of carbonaceous reducing material, to smelting heat under reducing conditions on the hearth of a reverberatory furnace to obtain a molten mass with carbon floating on its surface, said furnace being fired to give combustion gases which are somewhat oxidizing in character, thereby reducing and vaporizing the volatile metallic values, tapping off matte containing non-volatile values, and removing the gangue constituents of the ore as a molten slag relatively low in metallic values.

8. The process of smelting complex ores containing sulfur and carrying zinc, lead, and other metallic values such as copper, silver and gold, which comprises mixing naturally oxidized ores and partially roasted sulfid ores of the character described with carbonaceous reducing material, subjecting the mixture to smelting heat under reducing conditions on the hearth of a reverberatory furnace, thereby reducing and volatilizing zinc and lead, and obtaining the copper, silver and gold values in the form of a matte, and removing the gangue constituents of the ore as a slag relatively low in metallic values.

9. The process of smelting ores containing volatile values which comprises charging the ore mixed with a reducing agent on the hearth of a reverberatory furnace, the quantity of said reducing agent used being in excess of that necessary to effect the possible reductions in the charge, melting down the charge on the hearth by the combustion of a fuel with a moderate excess of preheated air, reducing the volatile constituents of the ore *in situ* by said reducing agent, volatilizing said volatile constituents, passing the gaseous products of the furnace through a regenerative stove and thereby preheating air for combustion, and subsequently separating volatile values from the gaseous products of combustion.

10. The process of smelting ores containing volatile and non-volatile values which comprises charging the ore mixed with a reducing agent on the hearth of a reverberatory furnace, the quantity of said reducing agent used being in excess of that necessary to effect the possible reductions in the charge, melting down the charge on the hearth by the combustion of a fuel with a moderate excess of preheated air, reducing the volatile constituents of the ore *in situ* by said reducing agent, volatilizing said volatile constituents, passing the gaseous products of the furnace through a regenerative stove and thereby preheating air for combustion, subsequently separating said volatile values from the gaseous products of combustion, and separating the non-volatile metallic values in the form of a matte.

11. The process of smelting complex, zinc bearing ores which comprises charging the ore mixed with an excess of a solid reducing agent on the hearth of a reverberatory furnace, melting down the charge by firing with powdered coal and an excess of preheated air, maintaining a substantially oxygen and carbon-dioxid free atmosphere immediately adjacent the ore, passing the gaseous products of the reaction through a regenerative stove, subsequently separating the volatile values from the gaseous products of combustion, removing the gangue constituents of the ore as a slag, and separating the non-volatile values in the form of a matte.

12. The process of smelting ores containing volatile and non-volatile values which comprises charging the ore mixed with an excess of a reducing agent on the hearth of a reverberatory furnace, heating the furnace by the combustion of a fuel with an excess of preheated air, reducing the volatile constituents of the ore *in situ* by said reducing agent, volatilizing said volatile constituents, separating said volatile values from the gaseous products of combustion, recovering the non-volatile metallic values in the form of a matte, and removing the gangue constituents of the ore as a slag low in volatile values.

13. A process of smelting ores containing volatile values comprising charging the ore mixed with a solid reducing agent on the hearth of a reverberatory furnace, heating the furnace by the combustion of a fuel with preheated air, reducing the volatile constituents of the ore *in situ* by said solid reducing agent, volatilizing said volatile constituents, passing the gaseous products of the furnace through a regenerative stove and thereby preheating the air of combustion, and subsequently separating said volatile values from the gaseous products of combustion.

14. A process of smelting ores containing volatile and non-volatile values comprising charging the ore mixed with a solid reducing agent on the hearth of a reverberatory furnace, heating the furnace by the combustion of a fuel with preheated air, reducing the volatile constituents of the ore *in situ* by said solid reducing agent, volatilizing said volatile constituents, passing the gaseous products of the furnace through a regenerative stove and thereby preheating the air of combustion, subsequently separating said volatile values from the gaseous products of combustion, and separating the non-volatile metallic values in the form of a matte.

15. A process of smelting ores containing volatile values comprising charging the ore mixed with a solid reducing agent on the hearth of a reverberatory furnace, heating the charge by the combustion of additional fuel low in moisture and hydrogen and thereby driving off said volatile values, passing the gaseous products through a regenerative stove and thereby preheating the air of combustion, and subsequently recovering said volatile values in a bag fume arrester.

16. A process of smelting ores containing volatile values comprising charging the ore mixed with a solid reducing agent on the hearth of a reverberatory furnace, heating the charge by the combustion of pulverized coal and thereby driving off said volatile values, passing the gaseous products through a regenerative stove and thereby preheating the air of combustion, and subsequently recovering said volatile values in a bag fume arrester.

17. A process of smelting ores containing volatile values comprising charging the ore mixed with a solid reducing agent on the hearth of a reverberatory furnace, heating the charge by the combustion of additional fuel low in moisture and hydrogen and thereby driving off said volatile values, passing the gaseous products through a regenerative stove and thereby preheating the air of combustion, subsequently recovering said volatile values in a bag fume arrester, and separating the non-volatile values in the form of matte.

18. A process of smelting ores containing volatile values comprising charging the ore mixed with a solid reducing agent on the hearth of a reverberatory furnace, heating the charge by the combustion of pulverized coal and thereby driving off said volatile values, passing the gaseous products through a regenerative stove and thereby preheating the air of combustion, subsequently recovering said volatile values in a bag fume arrester, and separating the non-volatile values in the form of matte.

19. A process of smelting complex, zinc bearing ores consisting in charging the ore mixed with a solid reducing agent on the hearth of a reverberatory furnace, heating said furnace by the combination of powdered coal with preheated air, maintaining a substantially oxygen and carbon-dioxid free atmosphere immediately adjacent the ore, passing the gaseous products of the reaction through a regenerative stove, subsequently separating the volatile values from the gaseous products of combustion, removing the gangue constituents of the ore as a slag, and separating the non-volatile values in the form of a matte.

20. A process of smelting ores containing volatile and non-volatile values comprising charging the ore mixed with a reducing agent on the hearth of a reverberatory furnace, heating the furnace by the combustion of a fuel with preheated air, reducing the volatile constituents of the ore *in situ* by said reducing agent, volatilizing said volatile constituents, separating said volatile values from the gaseous products of combustion, recovering the non-volatile metallic values in the form of a matte, and removing the gangue constituents of the ore as a slag low in volatile values.

In testimony whereof I hereunto affix my signature.

LEWIS BAILEY SKINNER.